(12) United States Patent
Reeves

(10) Patent No.: US 12,442,391 B1
(45) Date of Patent: Oct. 14, 2025

(54) SUMP PUMP FILTRATION UNIT

(71) Applicant: Mark J. Reeves, Old Saybrook, CT (US)

(72) Inventor: Mark J. Reeves, Old Saybrook, CT (US)

(*) Notice: Subject to any disclaimer, the term of this patent is extended or adjusted under 35 U.S.C. 154(b) by 423 days.

(21) Appl. No.: 16/255,046

(22) Filed: Jan. 23, 2019

(51) Int. Cl.
*F04D 29/70* (2006.01)
*B01D 29/52* (2006.01)
*B01D 35/02* (2006.01)
*B01D 35/26* (2006.01)

(52) U.S. Cl.
CPC ........... *F04D 29/708* (2013.01); *B01D 29/52* (2013.01); *B01D 35/02* (2013.01); *B01D 35/26* (2013.01); *B01D 2201/605* (2013.01)

(58) Field of Classification Search
CPC .... F04D 29/606; F04D 29/607; F04D 29/608; F04D 29/648; F04D 29/70–29/708; B01D 35/26; B01D 29/0004; B01D 29/0018; B01D 29/0029; B01D 29/0043; B01D 29/009; B01D 29/11; B01D 29/114; B01D 29/50; B01D 29/52; B01D 29/92; B01D 35/28; B01D 35/02; B01D 2201/605; F04B 39/16; F04B 53/005; F04B 23/021; F04B 53/20
See application file for complete search history.

(56) References Cited

U.S. PATENT DOCUMENTS

| | | | | |
|---|---|---|---|---|
| 3,960,733 A * | 6/1976 | Van Dieren | ............ | B01D 29/23 210/460 |
| 4,421,644 A * | 12/1983 | Gedye | .................... | A01K 63/04 210/233 |
| 5,931,603 A | 8/1999 | Swain et al. | | |
| 6,824,677 B2 * | 11/2004 | Martinez | ............... | E03F 5/0404 210/131 |
| 6,877,965 B2 | 4/2005 | McCall et al. | | |
| 7,036,577 B2 | 5/2006 | Minamijima et al. | | |
| 7,788,877 B2 | 9/2010 | Andras | | |
| 8,117,797 B2 | 2/2012 | Andras | | |
| 8,973,324 B2 | 3/2015 | Andras | | |
| 9,714,496 B2 | 7/2017 | Bouchard | | |
| 2014/0076820 A1* | 3/2014 | Caldwell | .................. | C02F 3/24 210/696 |
| 2017/0246567 A1* | 8/2017 | Mabe, Jr. | ............. | B01D 15/361 |

* cited by examiner

*Primary Examiner* — Essama Omgba
*Assistant Examiner* — Dnyanesh G Kasture
(74) *Attorney, Agent, or Firm* — Cramer Patent & Design, PLLC.; Aaron R. Cramer

(57) ABSTRACT

A sump pump filtration carrier incorporates a cage-like structure with a hinged lid. The carrier is configured to permit a sump pump to be operationally secured within, thereby prohibiting external debris from impeding the operation of the sump pump.

1 Claim, 4 Drawing Sheets

SUMP PUMP FILTRATION UNIT

FIELD OF THE INVENTION

The present invention relates generally to the field of a sump pump filtration unit.

BACKGROUND OF THE INVENTION

There are a variety of construction projects that take place below grade such as footer installation, foundations, utility trenches, repair work, and the like. In many locales, ground water infiltration is a common occurrence. Many contractors turn to the use of sump pumps to remove this water in a continuous manner, thus allowing construction to continue, around the clock if necessary.

However, as such excavations are made in freshly opened earth, mud, rocks, silt, and the like are almost as free flowing as the water itself. As such, it is common to also have the sump pump become clogged with debris. To combat this problem, a worker may have to be stationed at the pump continuously to frequently unclog the pump, resulting in a huge labor cost. Even so, debris is likely to still get past. Over time, this debris will negatively impact pump operation leading to frequent replacement at a high cost as well. Accordingly, there exists a need for a means by which a standard sump pump can be used in a construction type environment without the labor, cost, and aggravation that has been described above. The development of the sump pump filtration unit fulfills this need.

SUMMARY OF THE INVENTION

It is therefore an object of the present invention to provide a filtration carrier to accommodate a portable sump pump which comprises a six-sided structure having a first side, a front side, a second side, a rear side, and a bottom to form a five-sided box structure and a lid attached to the rear side with a hinge. The first side has a first side frame located about its perimeter, the first side, the front side, the second side, the rear side, and the bottom are made of a mesh-like material providing environmental communication with an interior of the filtration carrier from outside the six-sided structure. The lid is attached or affixed to the rear side via the hinge. The filtration carrier also comprises a respective perimeter frame having the first side, the front side, the second side, the rear side, and the bottom to provide rigidity and maintain an overall box-like structure of the filtration carrier. The front side has a front frame located about its perimeter, the second side has a second side frame located about its perimeter, the rear side has a rear frame located about its perimeter, the lid has a lid frame located about its perimeter, and the bottom has a bottom frame located about its perimeter, the side frames are attached to each other to provide rigidity of the filtration carrier.

The hinge may be integral with the rear edge of the lid frame and the top edge of the rear frame while the lid frame may be sized so as to overlap the respective top edges of the first side frame, the front frame, and the second side frame so as to not leave any gap when the lid is in a closed position. The lid may include a first aperture and a second aperture. The aperture may be located at a center of the lid and the second aperture is located adjacent to the first aperture. The first aperture may be circular and may provide environmental communication with the outside the filtration carrier.

The second aperture may also be circular and may provide environmental communication with the outside the filtration carrier. The mesh-like material may provide a means for enabling passage of water and finely entrained material to enter the interior of the filtration carrier while restricting entry of larger material that includes rocks, large clumps of mud or other debris into the interior of the filtration carrier.

The mesh-like material of each of the first side, the front side, the second side, the rear side, the lid, and the bottom may also incorporate a one-quarter inch hole. The filtration carrier may have a square cross-section, where each the side is fourteen inches in length.

A separate embodiment of the filtration carrier to accommodate a portable sump pump may comprising a six-sided structure having a first side, a front side, a second side, a rear side, and a bottom to form a five-sided box structure and a lid attached to the rear side with a hinge. The first side has a first side frame located about its perimeter. The front side may have a front frame located about its perimeter, the second side has a second side frame located about its perimeter, the rear side has a rear frame located about its perimeter.

The lid has a lid frame located about its perimeter, and the bottom has a bottom frame located about its perimeter, the side frames are attached to each other to provide rigidity of the filtration carrier, the first side, the front side, the second side, the rear side, and the bottom are made of a mesh-like material providing environmental communication with an interior of the filtration carrier from outside the six-sided structure. The mesh-like material provide a means for enabling passage of water and finely entrained material to enter the interior of the filtration carrier while restricting entry of larger material that includes rocks, large clumps of mud or other debris into the interior of the filtration carrier, the lid is attached or affixed to the rear side via the hinge, the lid includes a first aperture and a second aperture.

Adjacent a bottom edge of the first side frame and located on the first side is a first side panel, the first side panel is continuous with a width of the first side between opposing vertical inner edges of the first side frame. Adjacent the bottom edge of the front frame and located on the front side is a front panel, the front panel is continuous with a width of the front side between opposing vertical inner edges of the front frame, adjacent the bottom edge of the second side frame and located on the second side is a second side panel, the second side panel is continuous with a width of the second side between opposing vertical inner edges of the second side frame, adjacent the bottom edge of the rear frame and located on the rear side is a rear panel, the rear panel is continuous with a width of the rear side between opposing vertical inner edges of the rear frame, the first side panel, the front panel, the second side panel, and the rear panel provide a continuous solid band around the bottom edge of a respective the first side, the front side, the second side, and the rear side of the filtration carrier. A respective perimeter frame is provided having the first side, the front side, the second side, the rear side, and the bottom to provide rigidity and maintain an overall box-like structure of the filtration carrier.

The hinge may be integral with the rear edge of the lid frame and the top edge of the rear frame. The lid of the frame is sized so as to overlap the respective top edges of the first side frame, the front frame, and the second side frame so as to not leave any gap when the lid is in a closed position. The first aperture is located at a center of the lid and the second aperture is located adjacent to the first aperture. The first aperture may be circular and provides environmental communication with the outside the filtration carrier while the second aperture may also be circular and provides environmental communication with the outside the filtration carrier.

As with above, the apertures are sized to enable passage of an outlet hose of the sump pump and a cable bundle respectively. The apertures are alternately produced by knocking put a portion of the lid and delineated therefrom with one or more perforations. The filtration carrier has a square cross-section, where each the side is fourteen inches in length. The mesh-like material of each of the first side, the front side, the second side, the rear side, the lid, and the bottom incorporates a one-quarter inch hole.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
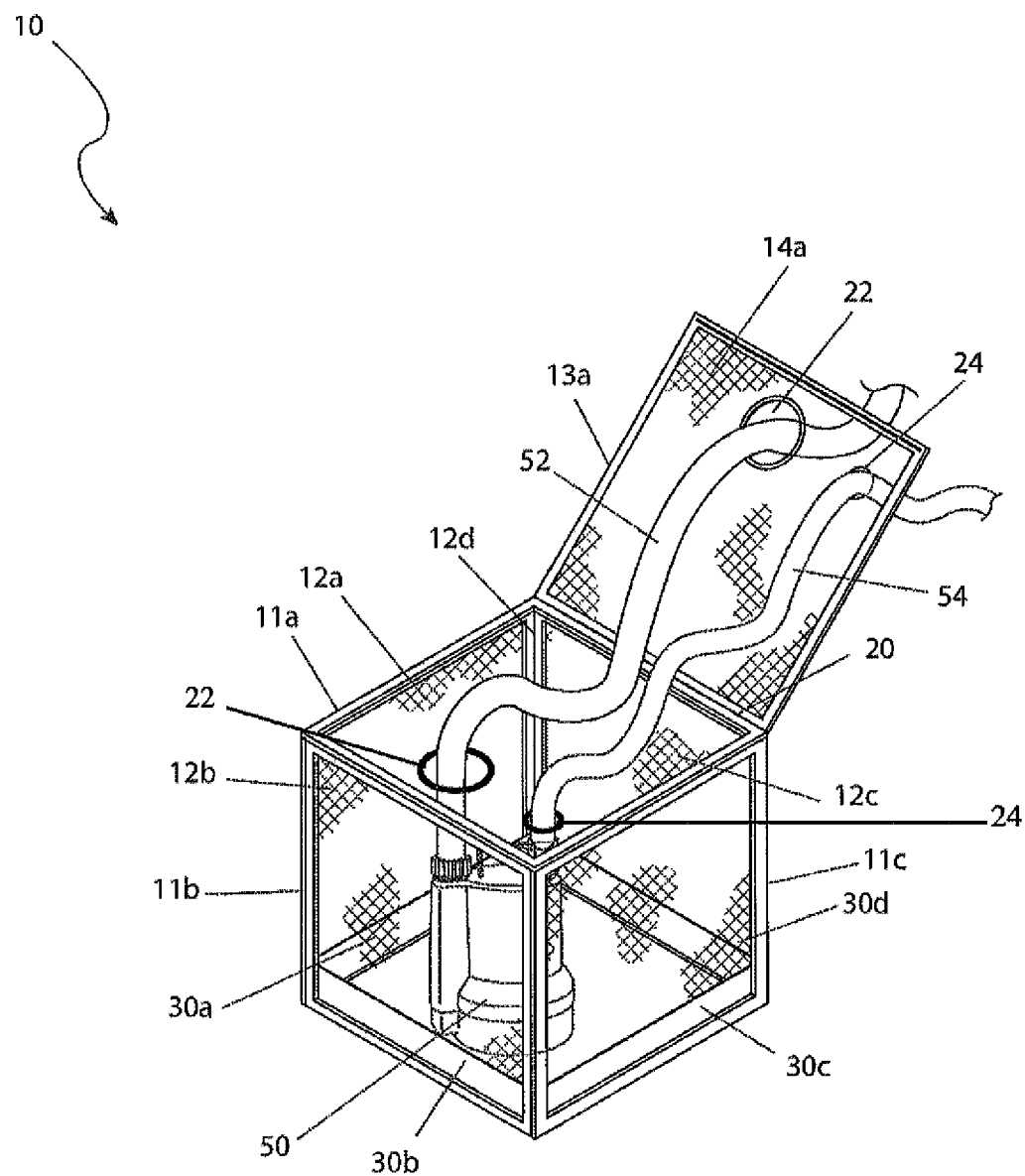
FIG. 1 is an environmental view of a filtration carrier 10 with a lid 14a in an open position with a sump pump 50 installed, according to an embodiment of the present invention.
Figure 2:
FIG. 2 is an environmental view of the filtration carrier 10 with the lid 14a in a closed position with a sump pump 50 installed, according to an embodiment of the present invention.
Figure 2:
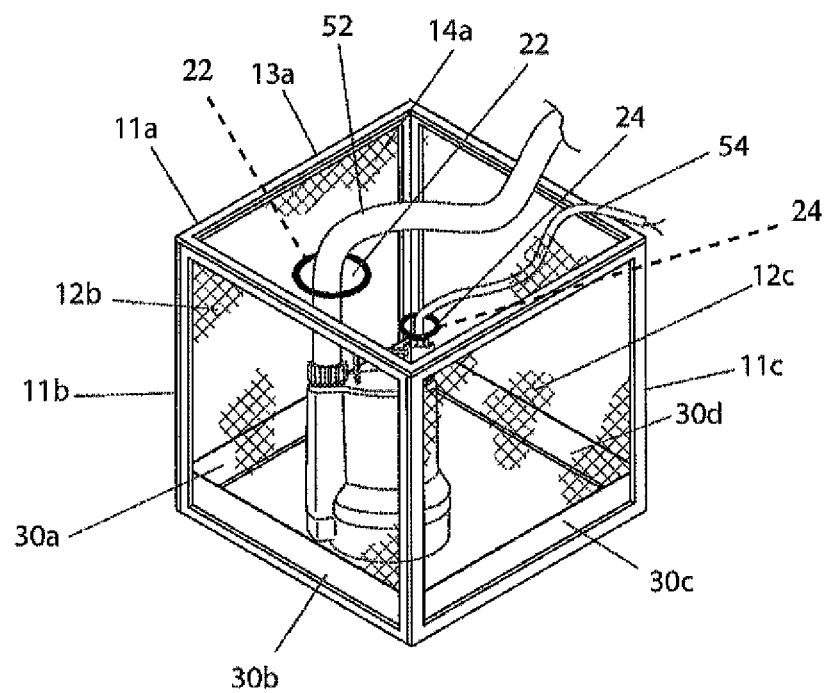

DESCRIPTIVE KEY 10 filtration carrier
11a first side frame
11b front frame
11c second side frame
11d rear frame
12a first side
12b front side
12c second side
12d rear side
13a lid frame
13b bottom frame
14a lid
14b bottom
20 hinge
22 first aperture
24 second aperture
30a first side panel
30b front panel
30c second side panel
30d rear panel
50 sump pump
52 outlet hose
54 wiring

DETAILED DESCRIPTION OF THE PREFERRED EMBODIMENT DEVICE

The best mode for carrying out the invention is presented in terms of this embodiment, herein depicted within FIG. 1 through 4.

The terms "a" and "an" herein do not denote a limitation of quantity, but rather denote the presence of at least one (1) of the referenced items.

Figure 3:
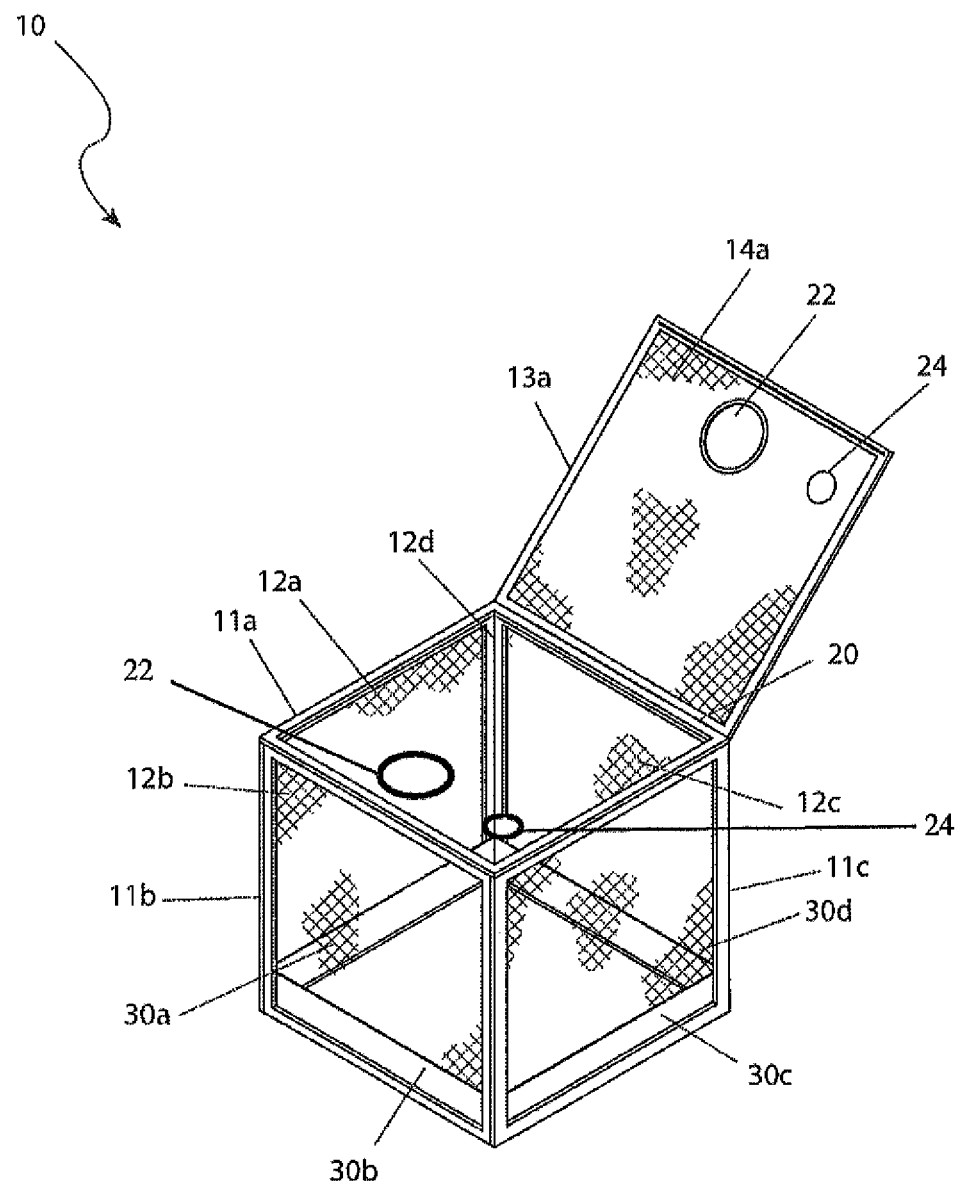
FIG. 3 is an environmental view of a filtration carrier 10 with the lid 14a in an open position, according to an embodiment of the present invention.
Figure 4:
FIG. 4 is bottom plan view of the filtration carrier 10 with the lid 14a in a closed position, according to an embodiment of the present invention.
Figure 4:
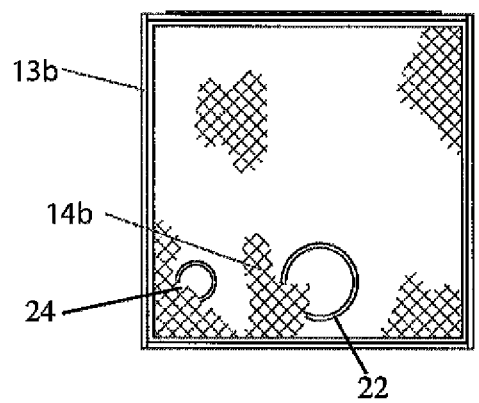

The present invention describes a box-like filtration carrier 10 sized and shaped to fully accommodate a portable sump pump 50 therein. The carrier 10 is preferably a six-sided structure with a lid 14a attached to a rear side 12d with a hinge 20. Referring now to the FIGS. 1 and 2, environmental views of the carrier 10 with a sump pump 50 stored therein, with the lid 14a in an open and a closed position. FIG. 3 illustrates the carrier 10 with the sump pump 50 removed for clarity of the illustration. FIG. 4 illustrates a bottom view of the carrier 10 with the sump pump 50 removed with the lid 14a in the closed position.

The carrier 10 comprises a six-sided structure, where the first side 12a, front side 12b, second side 12c, rear side 12d, and bottom 14b form a five-sided box structure, where the lid 14a is attached to the rear side 12d with a hinge 20. Each of the first side 12a, front side 12b, second side 12c, rear side 12d, lid 14a, and bottom 14b comprise a mesh-like material providing environmental communication with an interior of the carrier 10 with the outside. The first side 12a, front side 12b, second side 12c, rear side 12d, lid 14a, and bottom 14b, can be manufactured out of a singular material, or alternately, the first side 12a, front side 12b, second side 12c, rear side 12d, and bottom 14b can be made out of a singular material and the lid 14a can be manufactured out of the same material but attached via the hinge 20.

The carrier 10 has a square cross-section, where each side is fourteen inches (14 in.) in length. The mesh-like material of each of the first side 12a, front side 12b, second side 12c, rear side 12d, lid 14a, and bottom 14b incorporates a one-quarter inch (¼ in.) hole. It is however understood that any sizes, and shapes, such as rectangular, circular, ovular can be appreciated as falling under the scope of the present invention.

Each of the first side 12a, front side 12b, second side 12c, rear side 12d, lid 14a, and bottom 14b has a respective perimeter frame 11a, 11b, 11c, 11d, 13a, 13b to provide rigidity and maintain the overall box-like structure of the carrier 10. More specifically, the first side 12a has a first side frame 11a located about its perimeter, the front side 12b has a front frame 11b located about its perimeter, the second side 12c has a second side frame 11c located about its perimeter, the rear side 12d has a rear frame 11d located about its perimeter, the lid 14a has a lid frame 13a located about its perimeter, and the bottom 14b has a bottom frame 13b located about its perimeter.

The frame members 11a, 11b, 11c, 11d, 13a, 13b are attached or affixed to each other to provide the rigidity of the carrier 10. More specifically, the first side edge of the bottom frame 13b is attached or affixed to the bottom edge of the first side frame 11a, the front edge of the bottom frame 13b is attached or affixed to the bottom edge of the front frame 11b, the second side edge of the bottom frame 13b is attached or affixed to the bottom edge of the second side frame 11c, and the rear edge of the bottom frame 13b is attached or affixed to the bottom edge of the rear frame 11d. The front edge of the first side frame 11a is attached or affixed to the first side edge of the front frame 11b and the rear edge of the first side frame 11a is attached or affixed to the first side edge of the rear frame 11d. The front edge of the second side frame 11c is attached or affixed to the second side edge of the front frame 11b and the rear edge of the second side frame 11c is attached or affixed to the second side edge of the rear frame 11d. As aforementioned, the lid 14a is attached or affixed to the rear side 12d via a hinge 20.

More specifically, the hinge 20 can form a portion of, or be integral with, the rear edge of the lid frame 13a and the top edge of the rear frame 13d. The lid frame 13a is sized so as to at least partially or fully overlap the respective top edges of the first side frame 11a, the front frame 11b, and the second side frame 11c so as to not leave any gap when the lid 14a is in the closed position. In certain embodiments, there is a securing feature located on the lid frame 13a, preferably on the front edge, for securing the lid 14a to the upper edge of the front frame 11b.

At any location on the lid 14a is a first aperture 22 and a second aperture 24. The first aperture 22 is located adjacent or exactly at the center of the lid 14a and the second aperture 24 is located somewhat adjacent to the first aperture 22. The first aperture 22 is circular and provides environmental communication with the area outside the carrier 10. The second aperture 24 is also preferably circular and provides environmental communication with the area outside the carrier 10. The first aperture 22 is sized to enable passage of an outlet hose 52 of the sump pump 50. It is appreciated that her apertures 22 and 24 can be any shape so as to enable passage of the outlet hose 52 and cable bundle 54, respectively. The second aperture 24 is sized to enable passage of a cable bundle 54 providing power to the sump pump 50. The apertures 22, 224m, can also alternately be produced by knocking put a portion od the lid 14a and delineated therefrom with perforations.

The mesh-like material of the first side 12a, front side 12b, second side 12c, rear side 12d, lid 14a, and bottom 14b provide a means to enable passage of water and finely entrained material to enter the interior of the carrier 20 while restricting entry of larger material such as rocks or large clumps of mud or other debris into the interior of the carrier 10. When the sump pump 50 is installed within the interior of the carrier 10 and the lid 14a is closed, the inlet of the sump pump 50 can be free of the aforementioned restricted material and effectively transfer the water and finely entrained material that is filtered through the carrier 10 through the outlet hose 52 and to a remote location.

Adjacent the bottom edge of the first side frame 11a and located on the first side 12a is a first side panel 30a. The first side panel 30a is preferably continuous with the width of the first side 12a between opposing vertical inner edges of the first side frame 11a and is approximately one inch (1 in.) in height. Adjacent the bottom edge of the front frame 11b and located on the front side 12b is a front panel 30b. The front panel 30b is preferably continuous with the width of the front side 12b between opposing vertical inner edges of the front frame 11b and is approximately one inch (1 in.) in height. Adjacent the bottom edge of the second side frame 11c and located on the second side 12c is a second side panel 30c. The second side panel 30c is preferably continuous with the width of the second side 12c between opposing vertical inner edges of the second side frame 11c and is approximately one inch (1 in.) in height. Adjacent the bottom edge of the rear frame 11d and located on the rear side 12d is a rear panel 30d. The rear panel 30d is preferably continuous with the width of the rear side 12d between opposing vertical inner edges of the rear frame 11d and is approximately one inch (1 in.) in height. The first side panel 30a, front panel 30b, second side panel 30c, and rear panel 30d provide a continuous solid band around the bottom edge of the respective first side 12a, front side 12b, second side 12cc, and rear side 12d of the carrier 10. A logo or other indicia can be printed, embossed or otherwise sited thereon.

The invention claimed is:

1. A filtration carrier for accommodating a portable sump pump, consisting of:
    a six-sided structure comprising a first side, a front side, a second side, a rear side, a bottom, and a lid;
    a respective perimeter frame provided for each of said first side, said front side, said second side, said rear side, said bottom, and said lid to provide rigidity and maintain an overall box-like structure of said filtration carrier; and,
    a hinge connecting said lid to said rear side such that said lid is movable between an open position and a closed position to access and enclose said interior of said filtration carrier; and,
    wherein each of said first side, said front side, said second side, said rear side, said bottom, and said lid are made of a mesh-like material providing environmental communication between an interior and exterior of said filtration carrier;
    wherein said lid includes a first aperture and a second aperture;
    wherein said first aperture is located at a center of said lid and said second aperture is located adjacent to said first aperture;
    wherein said first aperture and said second aperture are sized to enable passage of an outlet hose of said sump pump and a cable bundle respectively;
    wherein said mesh-like material provides a means for enabling passage of water and finely entrained material into said interior while restricting entry of larger material including rocks or large clumps of mud; and,
    wherein a continuous solid band is provided around bottom edges of said first side, said front side, said second side, and said rear side.

* * * * *